US010176570B2

(12) United States Patent
Chou et al.

(10) Patent No.: US 10,176,570 B2
(45) Date of Patent: Jan. 8, 2019

(54) INTER-PATIENT BRAIN REGISTRATION (71) Applicant: SONY CORPORATION, Tokyo (JP)

(72) Inventors: Chen-Rui Chou, Palo Alto, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 15/353,679

(22) Filed: Nov. 16, 2016

(65) Prior Publication Data

US 2018/0137617 A1 May 17, 2018

(51) Int. Cl.
G06K 9/00 (2006.01)
G06T 7/00 (2017.01)
G06T 3/00 (2006.01)
G06T 7/32 (2017.01)

(52) U.S. Cl.
CPC .......... *G06T 7/0012* (2013.01); *G06T 3/0006* (2013.01); *G06T 7/0024* (2013.01); *G06T 7/32* (2017.01); *G06T 2207/10004* (2013.01); *G06T 2207/30016* (2013.01); *G06T 2207/30096* (2013.01)

(58) Field of Classification Search
CPC .... G06T 7/0012; G06T 3/0006; G06T 7/0024
See application file for complete search history.

(56) References Cited

U.S. PATENT DOCUMENTS

| 7,876,938 | B2 | 1/2011 | Huang et al. |
| 8,358,818 | B2 | 1/2013 | Miga et al. |
| 8,571,278 | B2 | 10/2013 | Sonka et al. |
| 8,774,481 | B2 | 7/2014 | Schreibmann et al. |
| 8,908,948 | B2 | 12/2014 | Fan et al. |
| 2007/0081712 | A1 | 4/2007 | Huang et al. |
| 2012/0093381 | A1 | 4/2012 | Fan et al. |
| 2014/0153797 | A1* | 6/2014 | Wan ............ G06T 3/0068 382/128 |
| 2015/0227702 | A1 | 8/2015 | Krishna et al. |

OTHER PUBLICATIONS

Bauer, Stefan, Lutz-P. Nolte, and Mauricio Reyes. "Segmentation of brain tumor images based on atlas-registration combined with a Markov-Random-Field lesion growth model." Biomedical Imaging: From Nano to Macro, 2011 IEEE International Symposium on. IEEE, 2011. (Year: 2011).*
Yeo, BT Thomas, et al. "Spherical demons: fast diffeomorphic landmark-free surface registration." IEEE transactions on medical imaging 29.3 (2010): 650-668. (Year: 2010).*
Marc Modat, Tom Vercauteren, Gerard R. Ridgway, David J. Hawkes, Nick C. Fox, Sébastien Ourselin, "Diffeomorphic demons using normalized mutual information, evaluation on multimodal brain MR images", Proc. SPIE 7623, Medical Imaging 2010: Image Processing, 76232K (Mar. 13, 2010) (Year: 2010).*
Yassa, Michael A., and Craig EL Stark. "A quantitative evaluation of cross-participant registration techniques for MRI studies of the medial temporal lobe." Neuroimage 44.2 (2009): 319-327. (Year: 2009).*

(Continued)

Primary Examiner — Nirav G Patel
(74) Attorney, Agent, or Firm — Haverstock & Owens LLP (57) ABSTRACT An inter-patient brain registration method for data normalization deformably aligns two brain images obtained from different patients even with tumor presence.

18 Claims, 9 Drawing Sheets (56) References Cited

OTHER PUBLICATIONS

Peyrat, Jean-Marc, et al. "Registration of 4D time-series of cardiac images with multichannel diffeomorphic demons." International Conference on Medical Image Computing and Computer-Assisted Intervention. Springer, Berlin, Heidelberg, 2008. (Year: 2008).*

Papież, Bartłomiej W., et al. "An implicit sliding-motion preserving regularisation via bilateral filtering for deformable image registration." Medical image analysis 18.8 (2014): 1299-1311. (Year: 2014).*

Ishikawa, M., et al. "A novel algorithm for particle tracking velocimetry using the velocity gradient tensor." Experiments in Fluids 29.6 (2000): 519-531. (Year: 2000).*

Gunnar Farneback and Carl-Fredrik Westin, "Athne and Deformable Registration Based on Polynomial Expansion", R. Larsen, M. Nielsen, and J. Sporring (Eds.): MICCAI 2006, LNCS 4190, pp. 857-864, Springer-Verlag Berlin Heidelberg.

* cited by examiner

Fig. 11

INTER-PATIENT BRAIN REGISTRATION

FIELD OF THE INVENTION

The present invention relates to imaging analysis. More specifically, the present invention relates to tumor imaging analysis.

BACKGROUND OF THE INVENTION

Parallel computing technologies enable computers to discover brain abnormalities by population analysis. Data normalization that brings up the patient images in the same coordinate space is key to the success of the population analysis. However, currently available normalization technologies for brain population analysis are still very basic. Brain normalization is currently based on affine registration that maps the source image to the target image using linear transformations, regardless of the discrepancy of soft tissue deformation and tumor existence.

SUMMARY OF THE INVENTION

An inter-patient brain registration method for data normalization deformably aligns two brain images obtained from different patients even with tumor presence.

In one aspect, a method programmed in a non-transitory memory of a device comprises performing affine registration to position a source image and a target image roughly to a same coordinate space, wherein the source image and the target image each include brain structures, and implementing diffeomorphic demons deformable registration with tumor-adaptive metrics to refine boundaries of the brain structures. Affine registration includes aligning images by preserving points, straight lines and planes. The diffeomorphic demons deformable registration utilizes vector fields and magnitudes. The diffeomorphic demons deformable registration utilizes an optical flow-derived deformation force and controllable regularization. The diffeomorphic demons deformable registration includes minimizing a matching error of image intensity over a deformation field. The tumor-adaptive metrics exclude error contribution of a tumor area. The diffeomorphic demons deformable registration includes using smooth deformation trajectory across registration time.

In another aspect, an apparatus comprises a non-transitory memory for storing an application, the application for: performing affine registration to position a source image and a target image roughly to a same coordinate space, wherein the source image and the target image each include brain structures and implementing diffeomorphic demons deformable registration with tumor-adaptive metrics to refine boundaries of the brain structures and a processing component coupled to the memory, the processing component configured for processing the application. Affine registration includes aligning images by preserving points, straight lines and planes. The diffeomorphic demons deformable registration utilizes vector fields and magnitudes. The diffeomorphic demons deformable registration utilizes an optical flow-derived deformation force and controllable regularization. The diffeomorphic demons deformable registration includes minimizing a matching error of image intensity over a deformation field. The tumor-adaptive metrics exclude error contribution of a tumor area. The diffeomorphic demons deformable registration includes using smooth deformation trajectory across registration time.

In another aspect, a system comprises a magnetic resonance imaging device and a computing device configured for: performing affine registration to position a source image and a target image roughly to a same coordinate space, wherein the source image and the target image each include brain structures and implementing diffeomorphic demons deformable registration with tumor-adaptive metrics to refine boundaries of the brain structures and a processing component coupled to the memory, the processing component configured for processing the application. Affine registration includes aligning images by preserving points, straight lines and planes. The diffeomorphic demons deformable registration utilizes vector fields and magnitudes. The diffeomorphic demons deformable registration utilizes an optical flow-derived deformation force and controllable regularization. The diffeomorphic demons deformable registration includes minimizing a matching error of image intensity over a deformation field. The tumor-adaptive metrics exclude error contribution of a tumor area. The diffeomorphic demons deformable registration includes using smooth deformation trajectory across registration time.

DETAILED DESCRIPTION OF THE PREFERRED EMBODIMENT

An inter-patient brain registration method begins with affine registration that brings two images roughly to the same coordinate space. Then, the method uses diffeomorphic demons deformable registration with novel tumor-adaptive metrics that further refine the boundaries of brain structures. The tumor-adapative metrics are enforced on tumor locations that are segmented using the method described in U.S. patent Ser. No. 15/218,986, titled, AUTOMATIC 3D BRAIN TUMOR SEGMENTATION AND CLASSIFICATION, which is hereby incorporated by reference in its entirety for all purposes.

Figure 1:
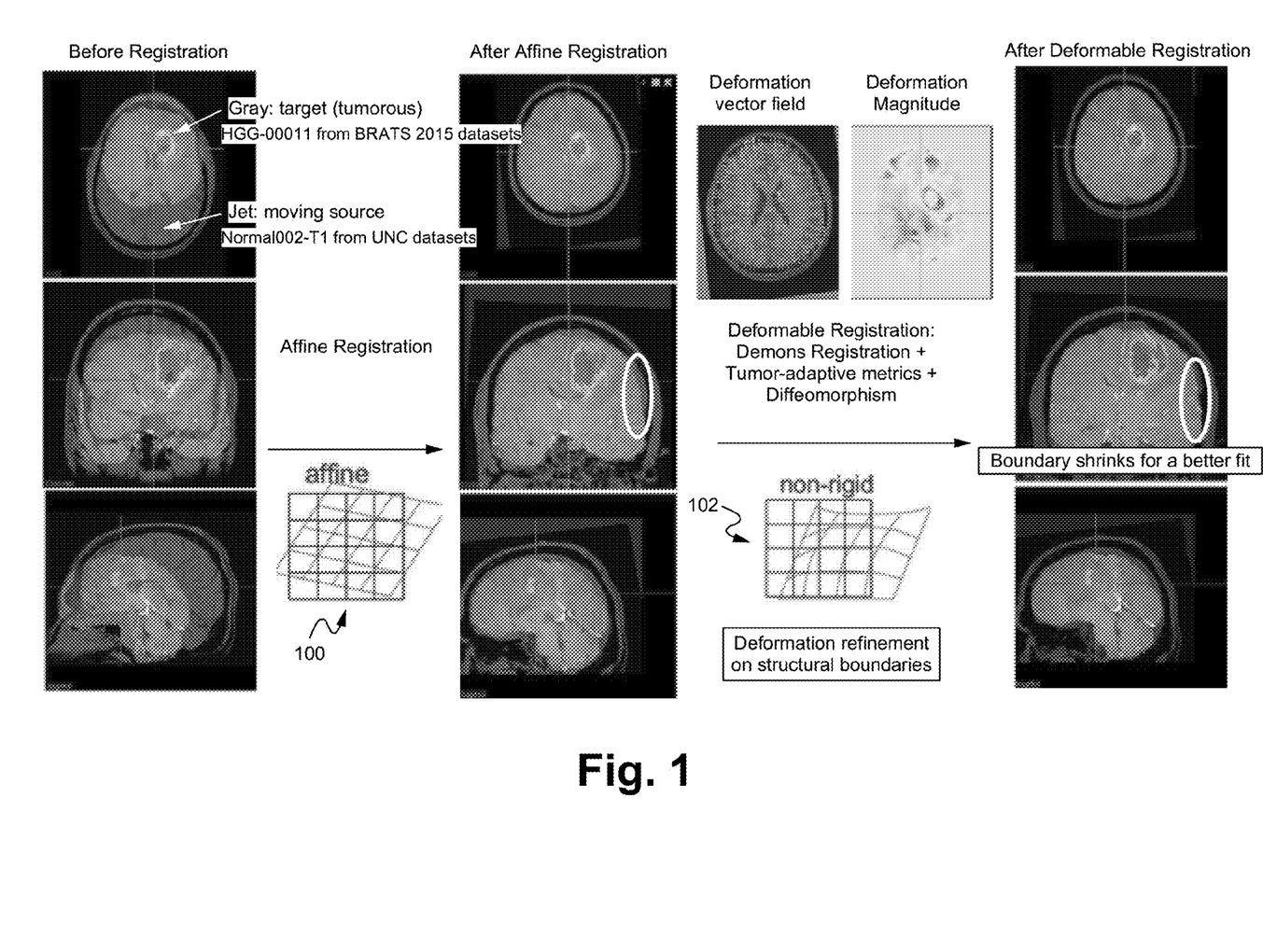
FIG. 1 illustrates a diagram of an inter-patient brain registration method according to some embodiments.

FIG. 1 illustrates a diagram of an inter-patient brain registration method according to some embodiments. In the step 100, affine registration is implemented. Affine registration attempts to align images by preserving points, straight lines and planes. For example, a target image and a source image (sometimes referred to as a moving image or moving source image) are aligned using affine registration. In the step 102, deformable registration is implemented. Deformable registration utilizes vector fields and magnitudes in the registration process.

Deformable registration also uses demons registration, tumor-adaptive metrics and diffeomorphism to improve the fit of the images. The deformable registration enables deformation refinement on structural boundaries. For example, after the target image and the source image are aligned using affine registration, deformable registration is able to improve on the alignment such as by deforming the source image to the target image or vice versa. In some embodiments, fewer or additional steps are implemented. For example, steps of acquiring the MRI information and/or displaying the registered images are able to be included. In some embodiments, the order of the steps is modified.

Figure 2:
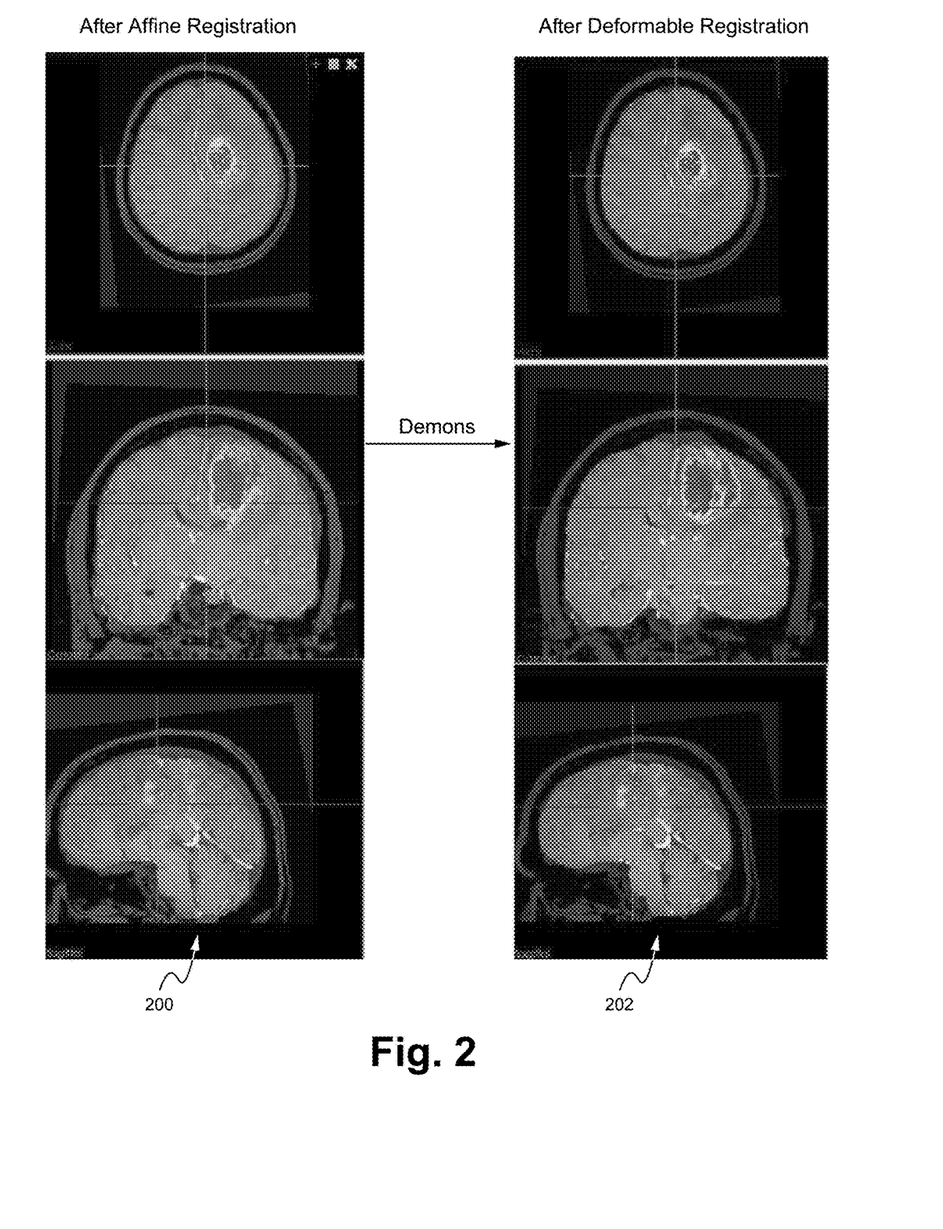
FIG. 2 illustrates a diagram of demons deformable registration according to some embodiments.

FIG. 2 illustrates a diagram of demons deformable registration according to some embodiments. The images in the set 200 are after affine registration, and the images in the set 202 are after deformable registration. The images in the set 202 are better aligned using deformable registration.

Figure 3:
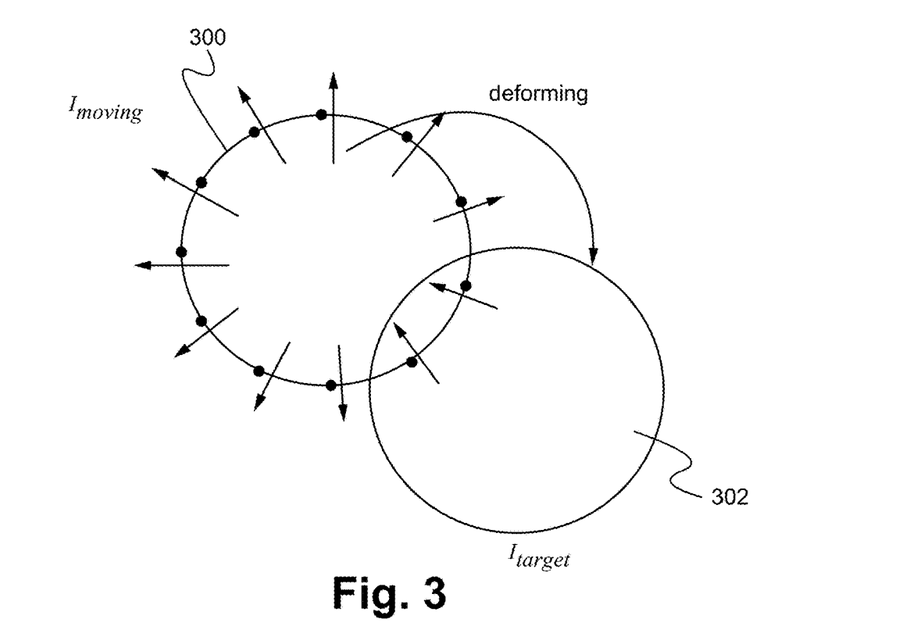
FIG. 3 illustrates a diagram of deforming a first image to a second image according to some embodiments.

FIG. 3 illustrates a diagram of deforming a first image to a second image according to some embodiments. The $I_{moving}$ image 300 (also referred to the source image) is deformed to the $I_{target}$ image 302 as described herein.

The demons deformable registration utilizes an optical flow-derived deformation force and controllable regularization. Optical flow-derived deformation force is calculated:

$$\nabla I \cdot \vec{v} = I_t$$

$$\nabla I_{moving} \cdot \vec{v} = I_{target} - I_{moving}$$

$$\nabla I_{moving} \cdot \vec{v} \cdot \nabla I_{moving} = (I_{target} - I_{moving}) \cdot I_{moving}$$

$$\vec{v} = \frac{(I_{target} - I_{moving}) \cdot \nabla I_{moving}}{|\nabla I_{moving}|^2}.$$

The velocity is proportional to the intensity of the mismatch along the spatial gradient.
Controllable Regularization:

$$\vec{v} = \frac{(I_{target} - I_{moving}) \nabla I_{moving}}{|\nabla I_{moving}|^2 + \alpha(I_{target} - I_{moving})^2},$$

where α controls the regularization priority: smoothness or data match.

$K(\vec{v})$ is Gaussian smoothing on the deformation (elastic). To perform the deforming, the matching error (Sum of Squared Difference (SSD) of the image intensity) is minimized over the deformation field: $SSD = \Sigma_x(I_{target}(x) - I_{moving}(x))^2$.

Figure 4:
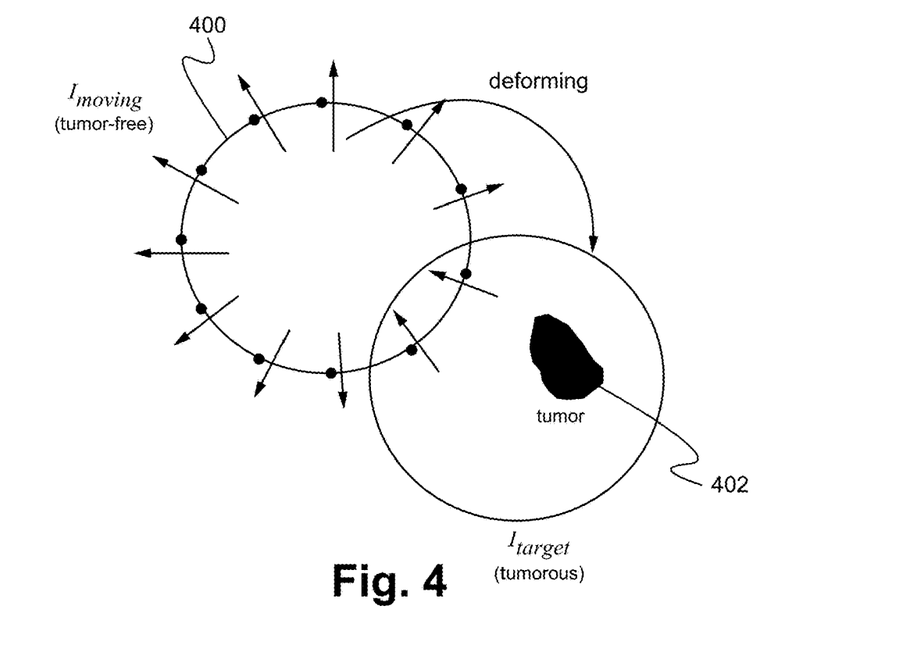
FIG. 4 illustrates a diagram of tumor adaptive metric for demons deformation registration according to some embodiments.

FIG. 4 illustrates a diagram of tumor adaptive metric for demons deformation registration according to some embodiments. The presence of a tumor contributes errors in the registration optimization, but a tumor-adaptive error metric that excludes error contribution at the tumor area addresses this issue. The result is: $SSD_{adaptive} = \Sigma_{x \notin tumor}(I_{target}(x) - I_{moving}(x))^2$. In other words, the minimization is performed on the images except for the area determined to be the tumor. The tumor is able to be determined in any manner such as by image comparison (e.g., compare a brain image without a tumor with the target or source image and if there are any significant differences, then indicate that area as a tumor), local minima detection, and/or any other image processing techniques for determining a tumor in an image. The $I_{moving}$ image 400 is deformed to the $I_{target}$ image 402 as described herein.

Figure 5:
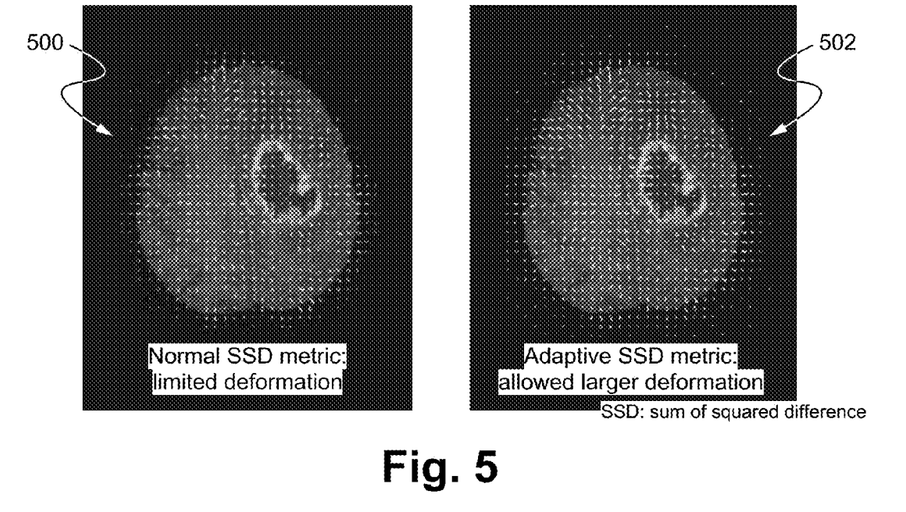
FIG. 5 illustrates a diagram of the difference between a normal SSD metric and an adaptive SSD metric according to some embodiments.

FIG. 5 illustrates a diagram of the difference between a normal SSD metric and an adaptive SSD metric according to some embodiments. The normal SSD metric 500 provides a limited deformation. The adaptive SSD metric 502 allows a larger deformation by excluding the error contribution at the tumor area.

Figure 6:
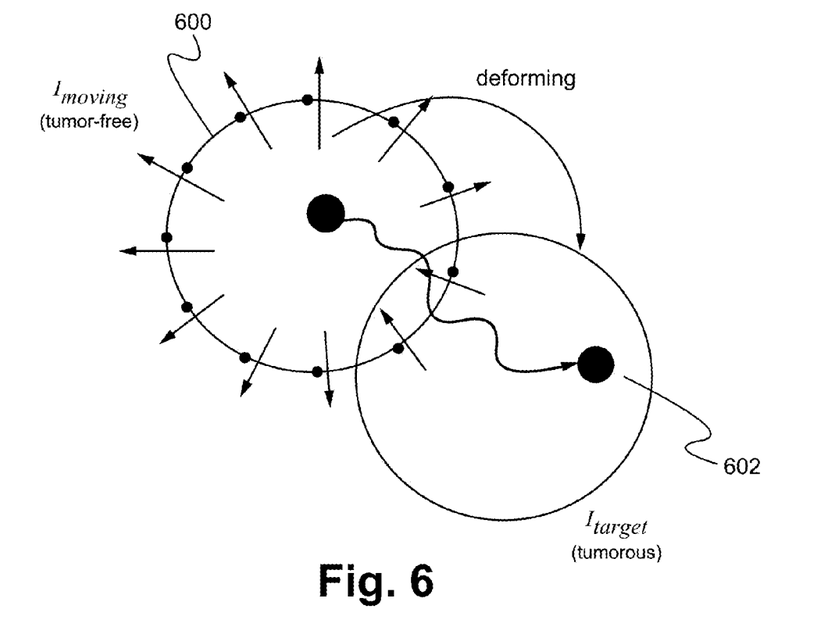
FIG. 6 illustrates a diagram of diffeomorphic demons registration according to some embodiments.

FIG. 6 illustrates a diagram of diffeomorphic demons registration according to some embodiments. The $I_{moving}$ image 600 is deformed to the $I_{target}$ image 602 using a smooth deformation trajectory across registration time as described herein. Since the large inter-patient anatomy variation uses a registration that allows large deformation, it is important to enforce the deformation trajectory to be smooth by computing "diffeomorphic" (inverse-consistent and smooth) deformation by smoothing the time-varying velocity field (fluid-like) instead of the final deformation field (elastic).

Figure 7:
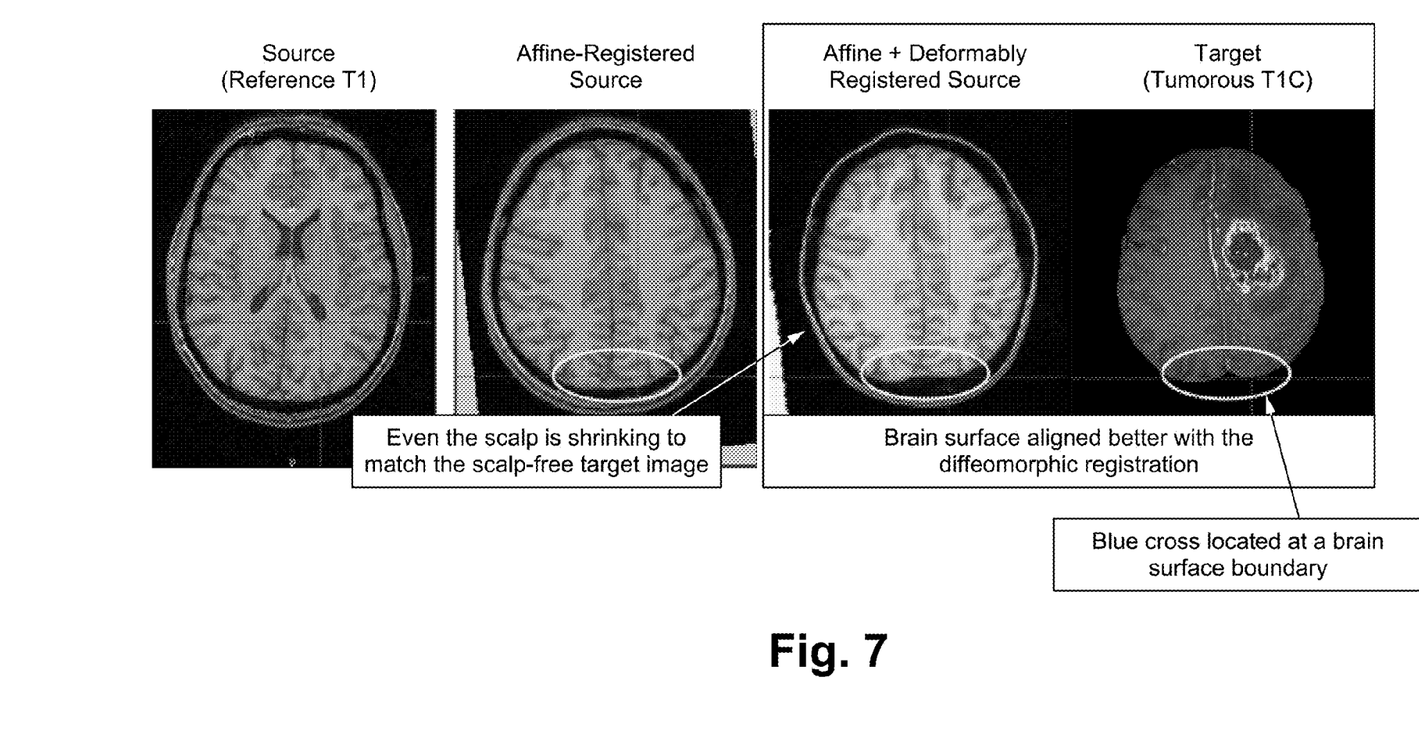
FIGS. 7-9 illustrate examples of improved brain surface and brain structure alignment after deformable registration.
Figure 8:
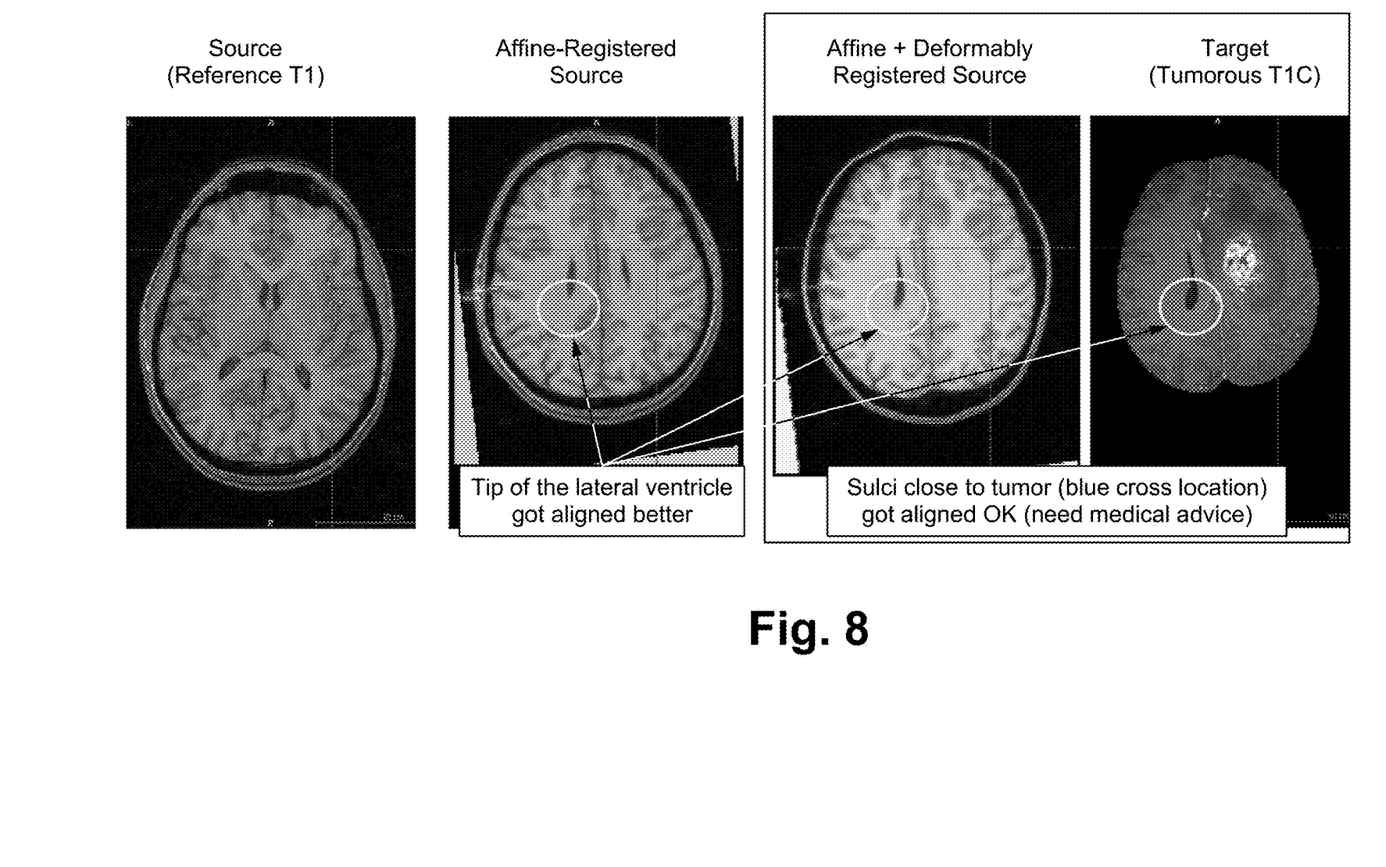
Figure 9:
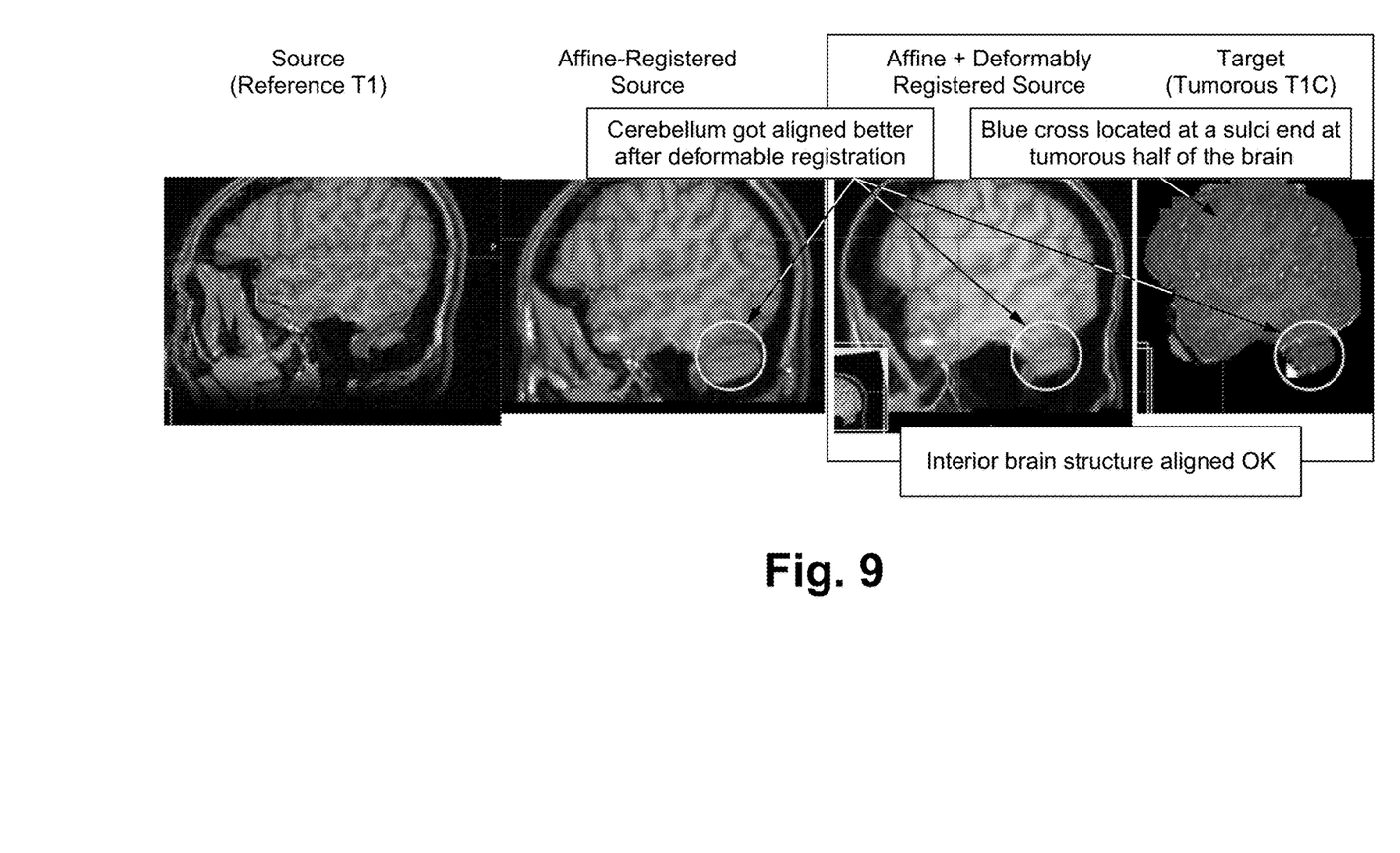

FIGS. 7-9 illustrate examples of improved brain surface and brain structure alignment after deformable registration.

Figure 10:
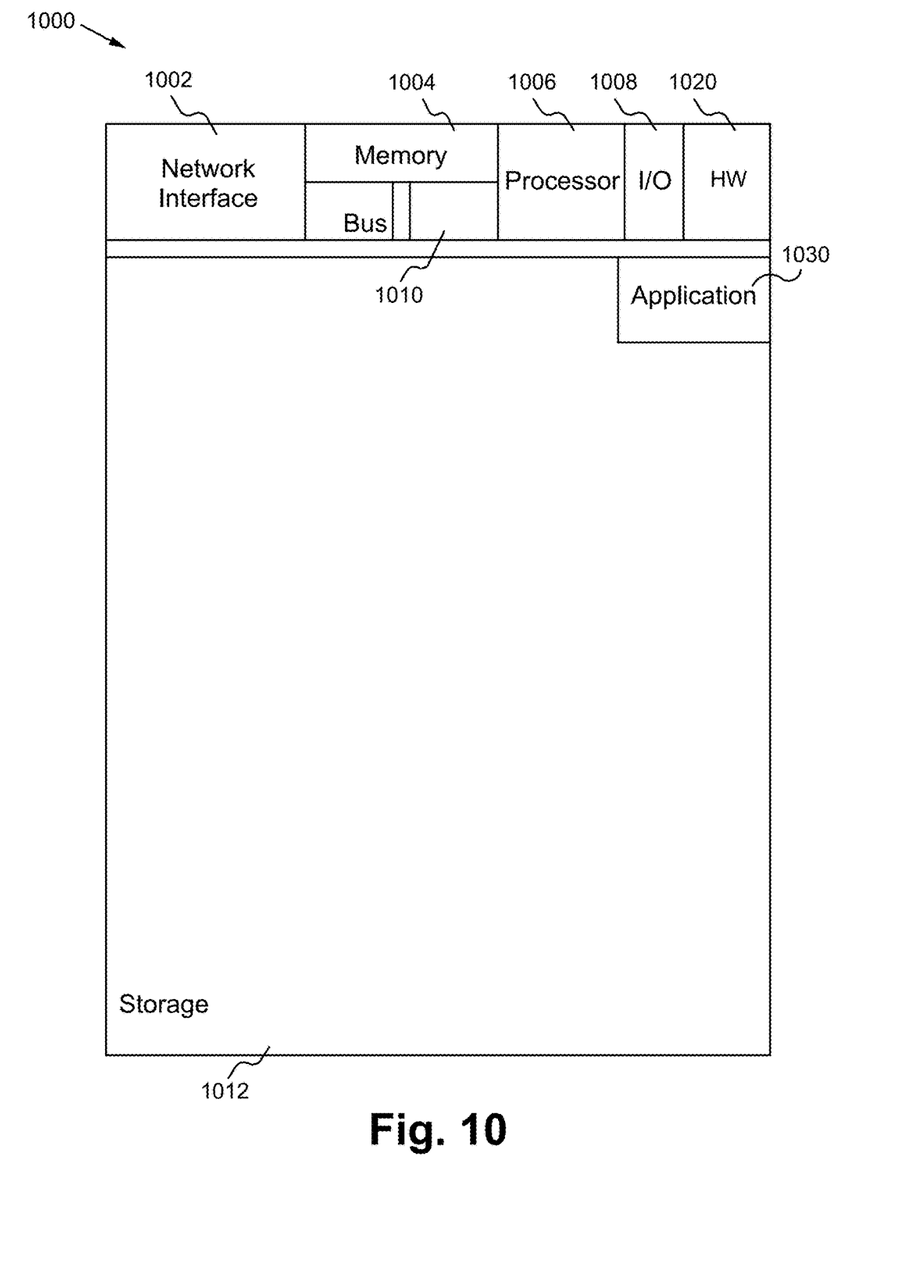
FIG. 10 illustrates a block diagram of an exemplary computing device configured to implement the inter-patient brain registration method according to some embodiments.

FIG. 10 illustrates a block diagram of an exemplary computing device configured to implement the inter-patient brain registration method according to some embodiments. The computing device 1000 is able to be used to acquire, store, compute, process, communicate and/or display information such as images and videos. In general, a hardware structure suitable for implementing the computing device 1000 includes a network interface 1002, a memory 1004, a processor 1006, I/O device(s) 1008, a bus 1010 and a storage device 1012. The choice of processor is not critical as long as a suitable processor with sufficient speed is chosen. The memory 1004 is able to be any conventional computer memory known in the art. The storage device 1012 is able to include a hard drive, CDROM, CDRW, DVD, DVDRW, High Definition disc/drive, ultra-HD drive, flash memory card or any other storage device. The computing device 1000 is able to include one or more network interfaces 1002. An example of a network interface includes a network card connected to an Ethernet or other type of LAN. The I/O device(s) 1008 are able to include one or more of the following: keyboard, mouse, monitor, screen, printer, modem, touchscreen, button interface and other devices. Inter-patient brain registration application(s) 1030 used to perform the inter-patient brain registration method are likely to be stored in the storage device 1012 and memory 1004 and processed as applications are typically processed. More or fewer components shown in FIG. 10 are able to be included in the computing device 1000. In some embodiments, inter-patient brain registration method hardware 1020 is included. Although the computing device 1000 in FIG. 10 includes applications 1030 and hardware 1020 for the inter-patient brain registration method, the inter-patient brain registration method is able to be implemented on a computing device in hardware, firmware, software or any combination thereof. For example, in some embodiments, the inter-patient brain registration method applications 1030 are programmed in a memory and executed using a processor. In another example, in some embodiments, the inter-patient brain registration method hardware 1020 is programmed hardware logic including gates specifically designed to implement the inter-patient brain registration method.

In some embodiments, the inter-patient brain registration method application(s) 1030 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch) or any other suitable computing device.

Figure 11:
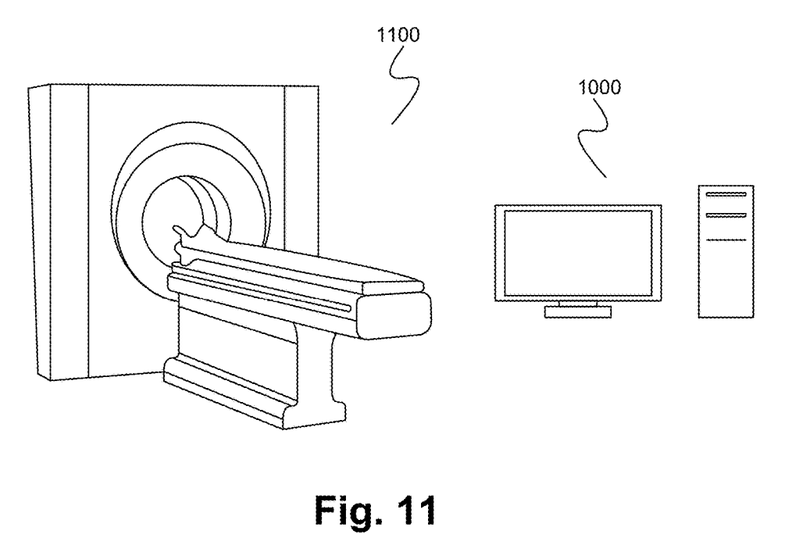
FIG. 11 illustrates a diagram of a Magnetic Resonance Imaging (MRI) system according to some embodiments.

FIG. 11 illustrates a diagram of a Magnetic Resonance Imaging (MRI) system according to some embodiments. An MRI device 1100 is used to acquire MRI images such as brain scans. A computing device 1000 receives the MRI information (e.g., by downloading or accessing in the cloud) from the MRI device 1200, and the computing device 1100 performs the inter-patient brain registration method.

To utilize the inter-patient brain registration method described herein, MRI information is analyzed using the inter-patient brain registration method. Based upon the analysis, brain abnormalities are able to be identified. Based upon the identified abnormalities, surgeons are able to take the appropriate actions.

In operation, the inter-patient brain registration method is able to utilize parallel computing to discover brain abnormalities by population analysis using brain normalization based on affine registration and deformable registration with tumor-adaptive metrics. This improvement results in better brain structure alignment than simply using affine registration.

Although the inter-patient brain registration method has been described herein related to brain tumors, the inter-patient brain registration method is able to be adapted for any other tumors or maladies.

Some Embodiments of Inter-Patient Brain Registration

1. A method programmed in a non-transitory memory of a device comprising:
performing affine registration to position a source image and a target image roughly to a same coordinate space, wherein the source image and the target image each include brain structures; and
implementing diffeomorphic demons deformable registration with tumor-adaptive metrics to refine boundaries of the brain structures.

2. The method of clause 1 wherein affine registration includes aligning images by preserving points, straight lines and planes.

3. The method of clause 1 wherein the diffeomorphic demons deformable registration utilizes vector fields and magnitudes.

4. The method of clause 1 wherein the diffeomorphic demons deformable registration utilizes an optical flow-derived deformation force and controllable regularization.

5. The method of clause 1 wherein the diffeomorphic demons deformable registration includes minimizing a matching error of image intensity over a deformation field.

6. The method of clause 1 wherein the tumor-adaptive metrics exclude error contribution of a tumor area.

7. The method of clause 1 wherein the diffeomorphic demons deformable registration includes using smooth deformation trajectory across registration time.

8. An apparatus comprising:
a non-transitory memory for storing an application, the application for:
performing affine registration to position a source image and a target image roughly to a same coordinate space, wherein the source image and the target image each include brain structures; and
implementing diffeomorphic demons deformable registration with tumor-adaptive metrics to refine boundaries of the brain structures; and
a processing component coupled to the memory, the processing component configured for processing the application.

9. The apparatus of clause 8 wherein affine registration includes aligning images by preserving points, straight lines and planes.

10. The apparatus of clause 8 wherein the diffeomorphic demons deformable registration utilizes vector fields and magnitudes.

11. The apparatus of clause 8 wherein the diffeomorphic demons deformable registration utilizes an optical flow-derived deformation force and controllable regularization.

12. The apparatus of clause 8 wherein the diffeomorphic demons deformable registration includes minimizing a matching error of image intensity over a deformation field.

13. The apparatus of clause 8 wherein the tumor-adaptive metrics exclude error contribution of a tumor area.

14. The apparatus of clause 8 wherein the diffeomorphic demons deformable registration includes using smooth deformation trajectory across registration time.

15. A system comprising:
a magnetic resonance imaging device; and
a computing device configured for:
performing affine registration to position a source image and a target image roughly to a same coordinate space, wherein the source image and the target image each include brain structures; and
implementing diffeomorphic demons deformable registration with tumor-adaptive metrics to refine boundaries of the brain structures; and
a processing component coupled to the memory, the processing component configured for processing the application.

16. The system of clause 15 wherein affine registration includes aligning images by preserving points, straight lines and planes.

17. The system of clause 15 wherein the diffeomorphic demons deformable registration utilizes vector fields and magnitudes.

18. The system of clause 15 wherein the diffeomorphic demons deformable registration utilizes an optical flow-derived deformation force and controllable regularization.

19. The system of clause 15 wherein the diffeomorphic demons deformable registration includes minimizing a matching error of image intensity over a deformation field.

20. The system of clause 15 wherein the tumor-adaptive metrics exclude error contribution of a tumor area.

21. The system of clause 15 wherein the diffeomorphic demons deformable registration includes using smooth deformation trajectory across registration time.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   performing affine registration to position a source image and a target image roughly to a same coordinate space, wherein the source image and the target image each include brain structures; and
   implementing diffeomorphic demons deformable registration with tumor-adaptive metrics to refine boundaries of the brain structures, wherein the diffeomorphic demons deformable registration utilizes an optical flow-derived deformation force and controllable regularization, further wherein the controllable regularization is prioritized based on smoothness or data matching by selecting one of smoothness or data matching, wherein the optical flow-derived deformation force is calculated using a velocity proportional to an intensity of a mismatch along a spatial gradient.

2. The method of claim 1 wherein affine registration includes aligning images by preserving points, straight lines and planes.

3. The method of claim 1 wherein the diffeomorphic demons deformable registration utilizes vector fields and magnitudes.

4. The method of claim 1 wherein the diffeomorphic demons deformable registration includes minimizing a matching error of image intensity over a deformation field.

5. The method of claim 1 wherein the tumor-adaptive metrics exclude error contribution of a tumor area.

6. The method of claim 1 wherein the diffeomorphic demons deformable registration includes using smooth deformation trajectory across registration time.

7. An apparatus comprising:
   a non-transitory memory for storing an application, the application for:
      performing affine registration to position a source image and a target image roughly to a same coordinate space, wherein the source image and the target image each include brain structures; and
      implementing diffeomorphic demons deformable registration with tumor-adaptive metrics to refine boundaries of the brain structures, wherein the diffeomorphic demons deformable registration utilizes an optical flow-derived deformation force and controllable regularization, further wherein the controllable regularization is prioritized based data matching by selecting data matching, wherein the optical flow-derived deformation force is calculated using a velocity proportional to an intensity of a mismatch along a spatial gradient; and
   a processing component coupled to the memory, the processing component configured for processing the application.

8. The apparatus of claim 7 wherein affine registration includes aligning images by preserving points, straight lines and planes.

9. The apparatus of claim 7 wherein the diffeomorphic demons deformable registration utilizes vector fields and magnitudes.

10. The apparatus of claim 7 wherein the diffeomorphic demons deformable registration includes minimizing a matching error of image intensity over a deformation field.

11. The apparatus of claim 7 wherein the tumor-adaptive metrics exclude error contribution of a tumor area.

12. The apparatus of claim 7 wherein the diffeomorphic demons deformable registration includes using smooth deformation trajectory across registration time.

13. A system comprising:
    a magnetic resonance imaging device; and
    a computing device configured for:
       performing affine registration to position a source image and a target image roughly to a same coordinate space, wherein the source image and the target image each include brain structures; and
       implementing diffeomorphic demons deformable registration with tumor-adaptive metrics to refine boundaries of the brain structures, wherein the diffeomorphic demons deformable registration utilizes an optical flow-derived deformation force and controllable regularization, further wherein the controllable regularization is prioritized based on smoothness or data matching by selecting one of smoothness or data matching, wherein the optical flow-derived deformation force is calculated using a velocity proportional to an intensity of a mismatch along a spatial gradient; and
    a processing component coupled to the memory, the processing component configured for processing the application.

14. The system of claim 13 wherein affine registration includes aligning images by preserving points, straight lines and planes.

15. The system of claim 13 wherein the diffeomorphic demons deformable registration utilizes vector fields and magnitudes.

16. The system of claim 13 wherein the diffeomorphic demons deformable registration includes minimizing a matching error of image intensity over a deformation field.

17. The system of claim 13 wherein the tumor-adaptive metrics exclude error contribution of a tumor area.

18. The system of claim 13 wherein the diffeomorphic demons deformable registration includes using smooth deformation trajectory across registration time.

* * * * *